(No Model.)
W. E. WARREN.
ATTACHMENT FOR INCREASING DIAMETER OF SPROCKET WHEELS.
No. 570,690. Patented Nov. 3, 1896.
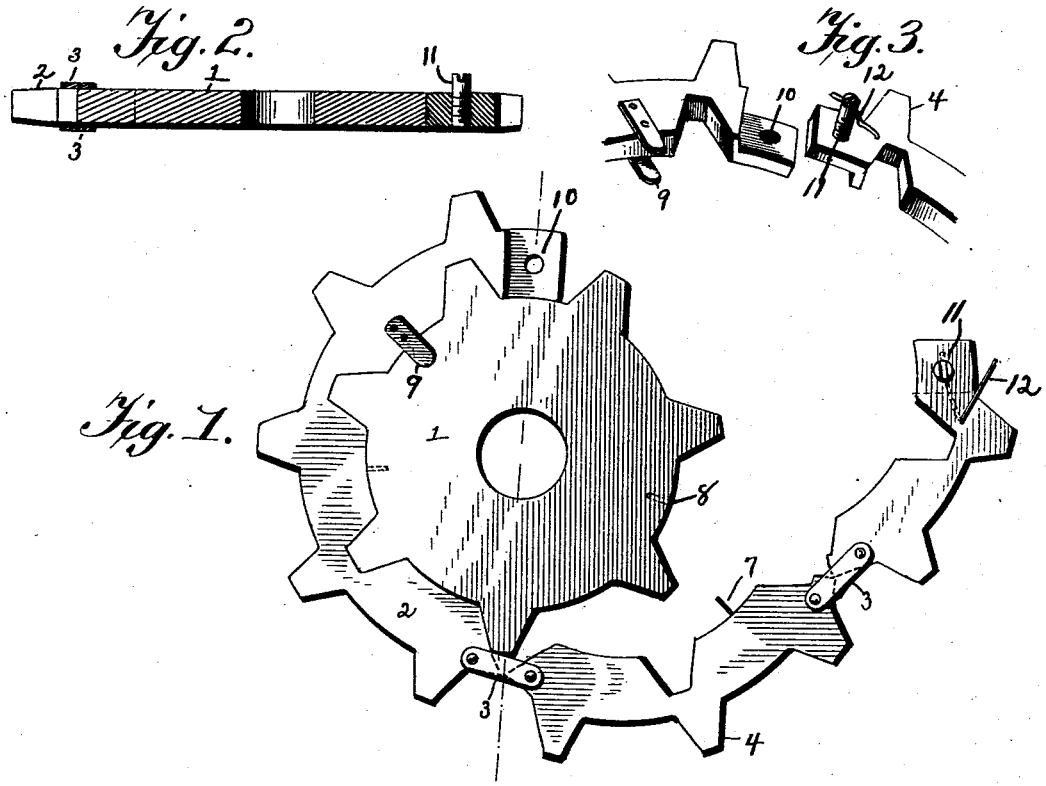

UNITED STATES PATENT OFFICE.

WILLIAM ELLERY WARREN, OF VICTOR, NEW YORK.

ATTACHMENT FOR INCREASING DIAMETER OF SPROCKET-WHEELS.

SPECIFICATION forming part of Letters Patent No. 570,690, dated November 3, 1896.

Application filed August 17, 1895. Serial No. 559,633. (No model.)

*To all whom it may concern:*

Be it known that I, WILLIAM ELLERY WARREN, a citizen of the United States, residing at Victor, in the county of Ontario and State of New York, have invented a certain new, useful, and valuable Improvement in Attachments for Increasing the Diameter of Sprocket-Wheels, of which the following is a full, clear, and exact description.

My invention has relation to attachments for increasing the diameter of sprocket-wheels; and it consists in the novel construction and arrangement of its parts, as hereinafter described.

In the accompanying drawings, Figure 1 is a side view of a sprocket-wheel, showing one form of the attachment partly in position on the wheel. Fig. 2 is a transverse sectional view of the wheel and attachment. Fig. 3 is a perspective view of the ends of the attachment.

As shown in Fig. 1, the sections are hinged together by the side pieces 3 3, and when the attachment is in place on the wheel 1 the said side pieces 3 3 bear against the sides of the spur of the sprocket-wheel, as shown in Fig. 2. This prevents the attachment from slipping laterally from the wheel 1. The interior of the attachment 2 corresponds to the periphery of the wheel 1, that is, there is a recess in the attachment adapted to receive a spur of the sprocket-wheel 1. The attachment entirely surrounds the wheel 1.

The outer periphery of the attachment is provided with the teeth 4, which are at the same distance apart as the spurs on the wheel 1.

The inner side of the attachment, as shown in Fig. 1, is provided with protrusions 7 7. Said protrusions enter recesses 8 8 in the periphery of the sprocket-wheel 1 when the attachment is secured in place. The sections, as shown in Fig. 1, may also be provided with the ears 9 9, which extend down on each side of the wheel 1 and also prevent the lateral displacement of the attachment.

A threaded perforation 10 is located in the end of one of the sections of the attachment, as shown in Fig. 1. A threaded screw 11 is located in a threaded perforation in the free end of the section at the other end of the chain of sections. When the attachment is in place on the wheel, said screw is adapted to be turned into the perforation 10, and thus the ends of the attachment are held together. One of the sections is provided with a spring-wire 12, the end of which is pivotally fixed in the section. Said wire is adapted to be placed in the groove of the screw 11, as indicated by the dotted lines in Fig. 1, and thus the wire serves as a device to prevent the screw from turning and getting out of place.

The attachment is designed especially for use on the sprocket-wheels of bicycles, but it can be used to advantage on other sprocket-wheels. When the attachment is placed on the wheel, a sufficient number of links have to be added to the sprocket-chain to compensate for the space taken up by the attachment.

Having described my invention, what I claim as new, and desire to secure by Letters Patent, is—

1. An attachment for increasing the diameter of wheels, the same consisting of sections hinged together, the interior of the sections coinciding with the shape of the periphery of the wheel, and teeth located on the periphery of the sections; the free ends of the sections having threaded perforations, a screw adapted to enter said perforations and secure the said ends together, said screw having in its end a lateral groove, a device for preventing said screw from turning consisting of a spring-rod pivotally secured at one end to a section and adapted to lie in the groove of the screw, said spring-rod adapted to be revolved aside on its pivot point when removed from the groove of the screw, as set forth.

2. A device for increasing the diameter of wheels, the same consisting of an attachment adapted to be applied to the periphery of the wheel, said attachment in its interior coinciding with the shape of the periphery of the wheel, and teeth located on the periphery of the attachment; radial protrusions secured to the attachment and extending into the periphery of the wheel, and adapted to prevent the attachment from slipping laterally from the wheel.

3. A device for increasing the diameter of wheels, the same consisting of an attachment adapted to be applied to the periphery of the wheel, said attachment consisting of a series of sections hinged together, said attachment in its interior coinciding with the shape of the periphery of the wheel, and teeth located on the periphery of the attachment; radial protrusions secured to the sections of the attachment and extending into the periphery of the wheel, and adapted to prevent the attachment from slipping laterally from the wheel.

4. An attachment for increasing the diameter of wheels, the same consisting of sections hinged together, the interior of the sections coinciding with the shape of the periphery of the wheel, and teeth located on the periphery of the sections; radial protrusions permanently and rigidly secured to the interior of the sections, the exposed ends of said protrusions being smooth; the periphery of the wheel having recesses of smooth bore, said recesses adapted to receive the smooth ends of said protrusions, and thereby prevent the attachment from slipping laterally from the wheel.

In testimony whereof I affix my signature in presence of two witnesses.

WILLIAM ELLERY WARREN.

Witnesses:
C. W. DANE,
GEO. PATTERSON.